US012409665B2

(12) United States Patent
Fukuchi et al.

(10) Patent No.: US 12,409,665 B2
(45) Date of Patent: Sep. 9, 2025

(54) PRINTER AND NON-TRANSITORY COMPUTER READABLE STORAGE MEDIUM

(71) Applicant: BROTHER KOGYO KABUSHIKI KAISHA, Nagoya (JP)

(72) Inventors: Isao Fukuchi, Gifu (JP); Akira Minami, Nagoya (JP); Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 203 days.

(21) Appl. No.: 18/300,316

(22) Filed: Apr. 13, 2023

(65) Prior Publication Data

US 2023/0347661 A1 Nov. 2, 2023

(30) Foreign Application Priority Data

Apr. 28, 2022 (JP) ................................ 2022-075422

(51) Int. Cl.

| | |
|---|---|
| ***B41J 2/355*** | (2006.01) |
| ***B41J 2/21*** | (2006.01) |
| ***B41J 2/32*** | (2006.01) |
| ***B41J 2/36*** | (2006.01) |

(52) U.S. Cl.

CPC ............... *B41J 2/3558* (2013.01); *B41J 2/21* (2013.01); *B41J 2/32* (2013.01); *B41J 2/36* (2013.01)

(58) Field of Classification Search

CPC ..... B41J 2/3558; B41J 2/21; B41J 2/36; B41J 2/32

See application file for complete search history.

(56) References Cited

U.S. PATENT DOCUMENTS

2008/0238967 A1 * 10/2008 Busch .................... B41J 2/5056 347/11

2021/0141328 A1 5/2021 Sasaki et al.

FOREIGN PATENT DOCUMENTS

JP 2006062085 A * 3/2006 ................ B41J 2/35

JP 2019-214206 A 12/2019

* cited by examiner

*Primary Examiner* — Yaovi M Ameh

(74) *Attorney, Agent, or Firm* — KENEALY VAIDYA LLP

(57) ABSTRACT

A printer includes a thermal head including a plurality of heat generating elements configured to apply energy to a recording medium, and a controller configured to perform control of periodically supplying the power to the plurality of heat generating elements. The recording medium includes a first color developing portion configured to develop a first color and a second color developing portion configured to develop a second color. The controller is configured to periodically supply the power to the plurality of heat generating elements, set an average cycle for supplying the power to a first average cycle, in a case of causing the first color developing portion to develop the first color, and set an average cycle for supplying the power to a second average cycle longer than the first average cycle, in a case of causing the second color developing portion to develop the second color.

4 Claims, 9 Drawing Sheets

PRINTER AND NON-TRANSITORY COMPUTER READABLE STORAGE MEDIUM

REFERENCE TO RELATED APPLICATIONS

This application claims priority from Japanese Patent Application No. 2022-075422 filed on Apr. 28, 2022. The entire content of the priority application is incorporated herein by reference.

BACKGROUND ART

A thermal printer capable of performing multicolor printing has been proposed. A related art discloses an image forming apparatus configured to perform printing using an image member including a plurality of color developing layers having different color developing characteristics. The image forming apparatus is configured to repeatedly apply energy to the image member from a print head at predetermined cycles. The image forming apparatus is configured to control a time for which the energy is applied in each of the cycles and to cause each of the plurality of color developing layers to develop a color, to form an image on the image member.

DESCRIPTION

In a case where the multicolor printing is performed by the above-described method, an expensive printer having high performance is required in order to accurately control the energy applied to a recording medium to cause a desired color developing layer to develop a color. On the other hand, there is a demand for achieving the multicolor printing using an inexpensive printer.

An object of the present disclosure is to provide a printer and a non-transitory computer readable storage medium storing a printing program capable of achieving multicolor printing in which energy applied to a recording medium is accurately controlled and a color developing layer appropriately develops a color at a low cost.

In the printer according to the present disclosure, a controller is configured to: periodically supply the power to the plurality of heat generating elements until an end timing determined according to the power measured by the measuring unit; set an average cycle for supplying the power to a first average cycle, in a case of causing the first color developing portion to develop the first color; and set an average cycle for supplying the power to a second average cycle longer than the first average cycle, in a case of causing the second color developing portion to develop the second color.

In the printer according to the present disclosure, the average cycle for supplying the power to the plurality of heat generating elements of the thermal head in order to cause the recording medium to develop a color is made different between the case of causing the first color developing portion of the recording medium to develop the color and the case of causing the second color developing portion of the recording medium to develop the color. Accordingly, the printer can accurately apply, to the recording medium, the power and a supply time required for causing the first color developing portion of the recording medium to develop the color, and the power and a supply time required for causing the second color developing portion of the recording medium to develop the color. Accordingly, the printer can appropriately cause the first color developing portion and the second color developing portion of the recording medium to develop the colors. Further, by setting the cycle for supplying the power in the case of causing the second color developing portion to develop the color to a second cycle longer than a first cycle, it is possible to appropriately cause the first color developing portion and the second color developing portion of the recording medium to develop the colors with a low-grade and inexpensive configuration.

In the printer according to the present disclosure, a controller is configured to: acquire a type of the recording medium; periodically supply the power to the plurality of heat generating elements until an end timing determined according to the power measured by the measuring unit; and switch an average cycle for supplying the power, according to the acquired type of the recording medium.

In the printer according to the present disclosure, a cycle for supplying the power to the thermal head to cause the recording medium to develop a color is switched according to the type of the recording medium. Accordingly, the printer can specify and accurately apply the power and a supply time required for causing the recording medium to develop the color for each type of recording medium. Accordingly, the printer can appropriately cause the recording medium to develop the color.

In a non-transitory computer readable storage medium storing a printing program according to the present disclosure, the printing program includes instruction that, when executed by the computer, causes the computer to: periodically supply the power to the plurality of heat generating elements until an end timing determined according to the power measured by a measuring unit, the measuring unit being configured to measure the power supplied to the plurality of heat generating elements; set an average cycle for supplying the power to a first average cycle, in a case of causing the first color developing portion to develop the first color; and set an average cycle for supplying the power to a second average cycle longer than the first average cycle, in a case of causing the second color developing portion to develop the second color.

In a non-transitory computer readable storage medium storing a printing program according to the present disclosure, the printing program including instruction that, when executed by the computer, causes the computer to: acquiring a type of the recording medium; periodically supplying the power to the plurality of heat generating elements until an end timing determined according to the power measured by a measuring unit, the measuring unit being configured to measures the power supplied to the plurality of heat generating elements; and switching an average cycle for supplying the power, according to the acquired type of the recording medium.

Figure 2:
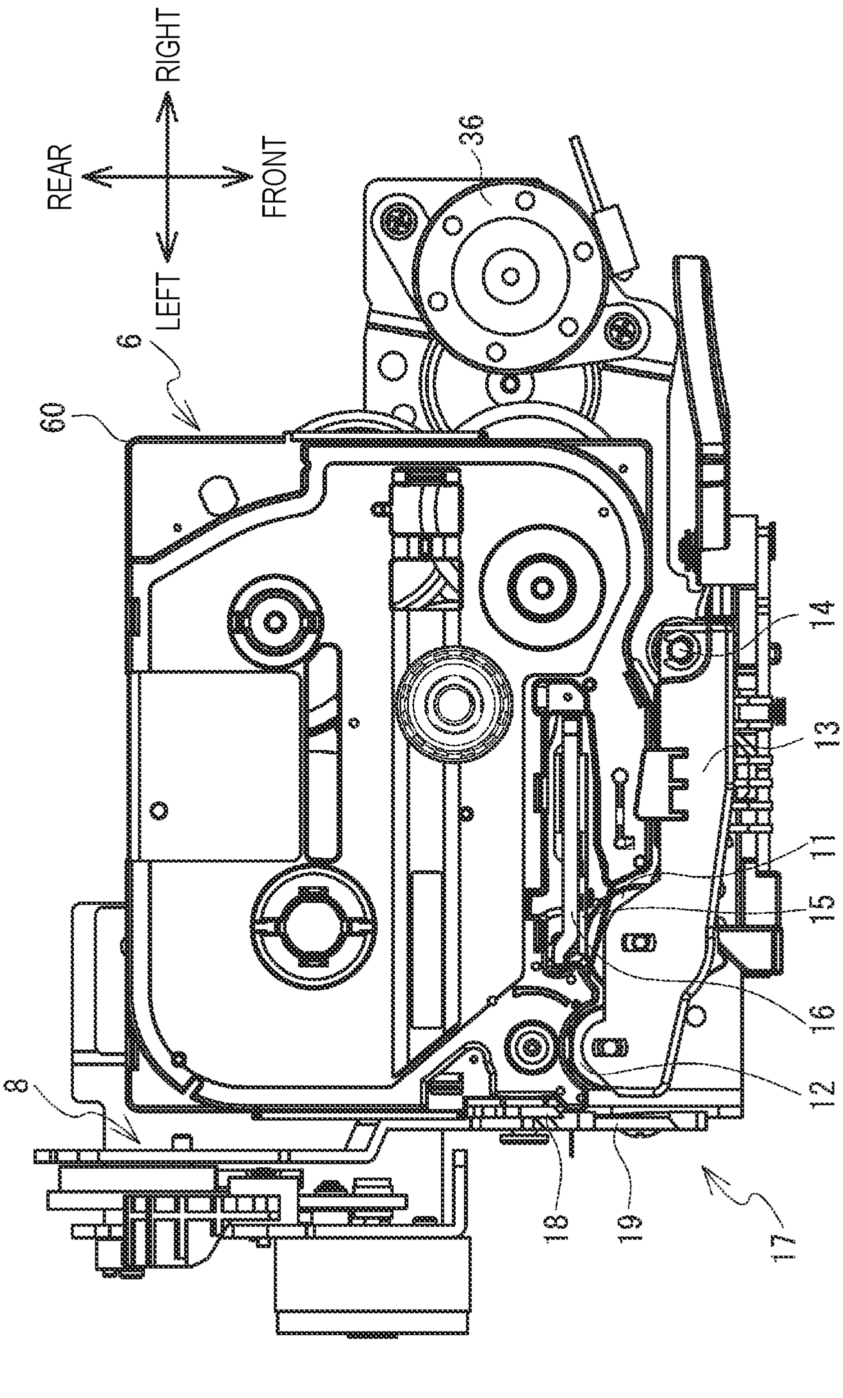

FIG. 2 is a plan view of a cassette mounting portion 8 on which the cassette 6 is mounted, in which a bottom surface of the cassette mounting portion 8 is not shown.

Figure 3:
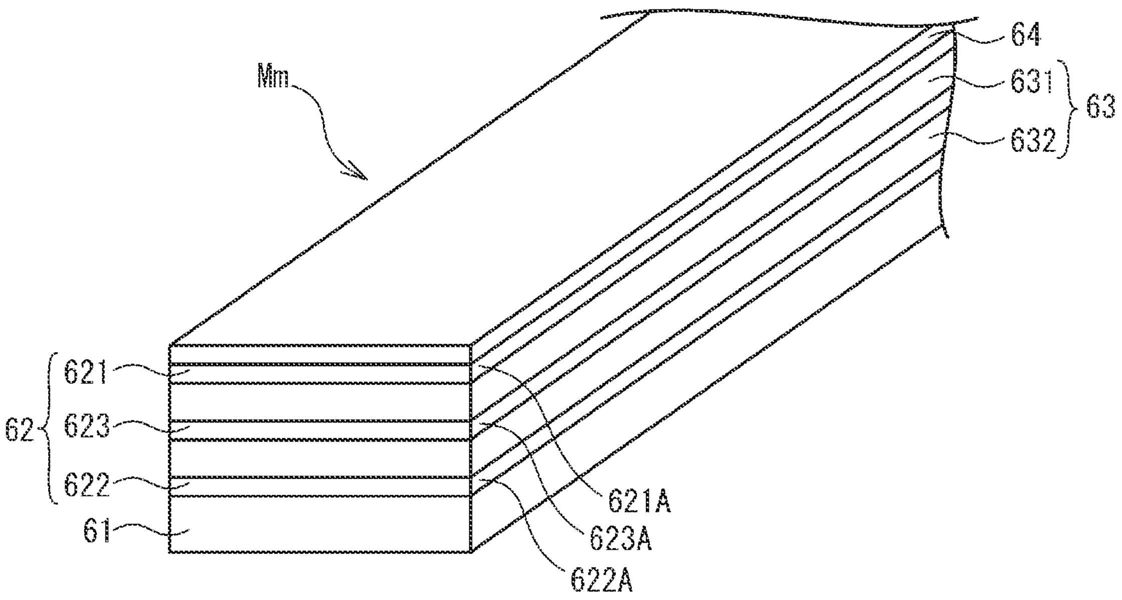

FIG. 3 is a perspective view of a thermosensitive tape M.

Figure 4:
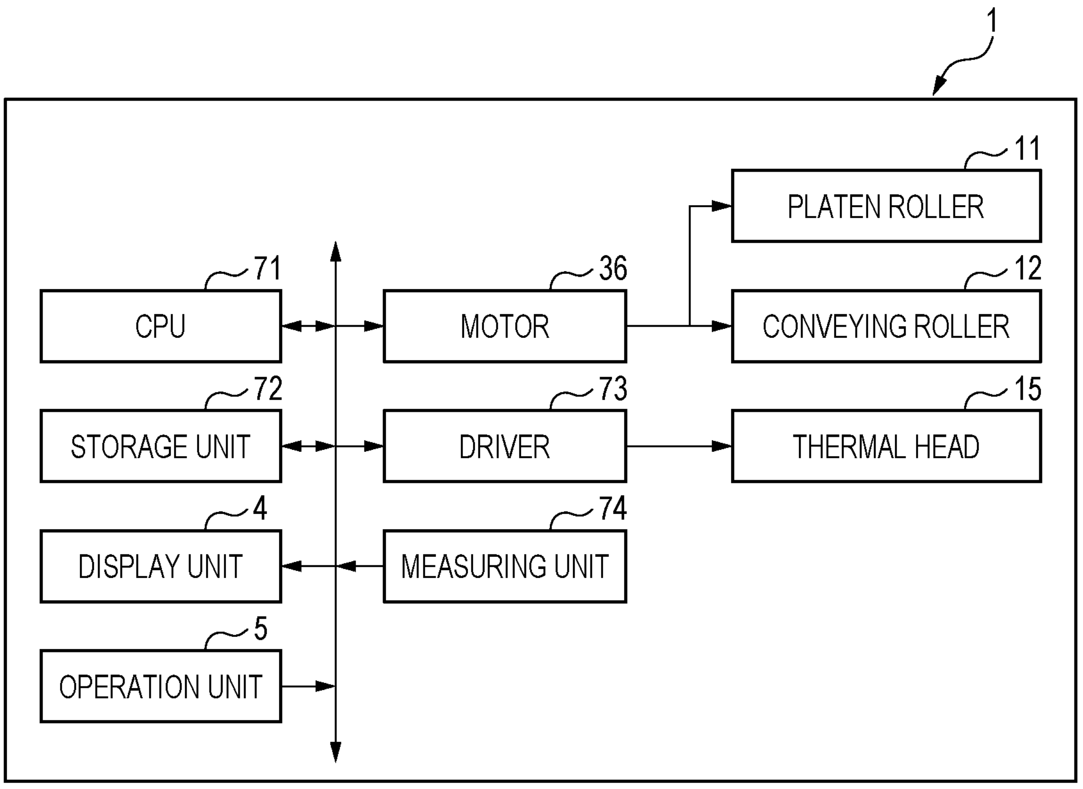

FIG. 4 is a block diagram showing an electrical configuration of the printer 1.

Figure 5:
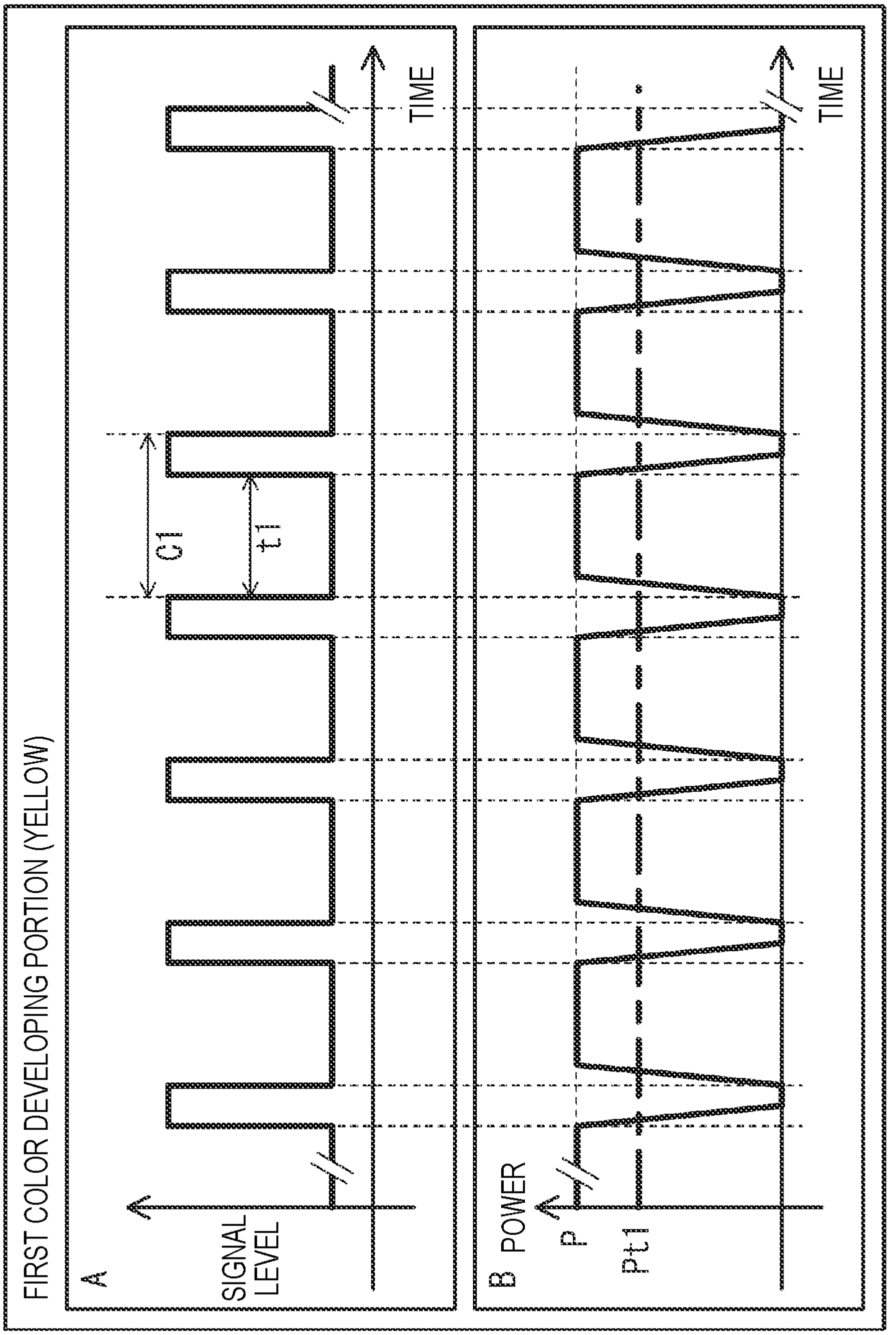

FIG. 5 is a graph showing temporal changes of a signal level output to a driver 73 and power actually supplied by to the driver 73 in a case where a first color developing portion 621A is caused to develop a color.

Figure 6:
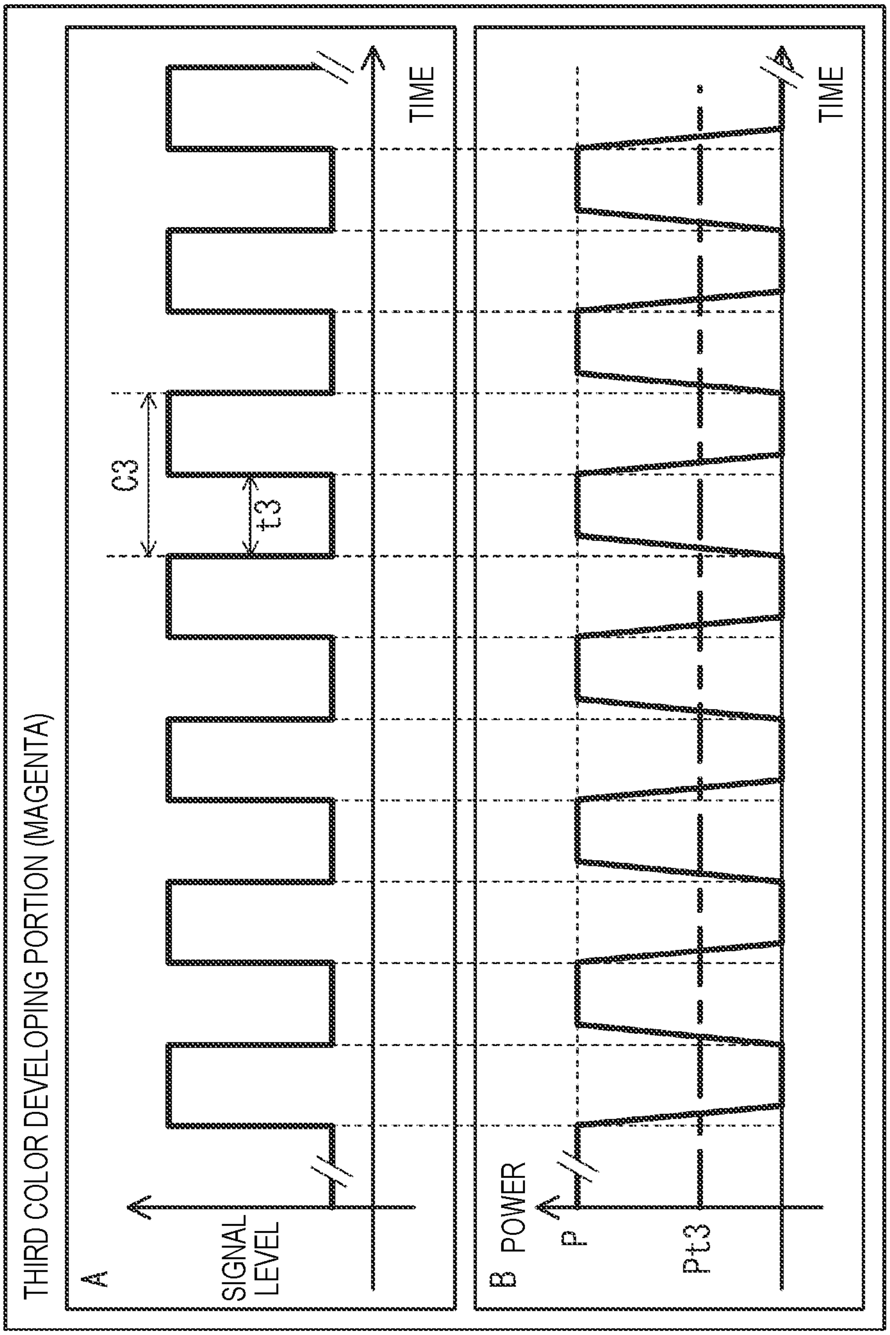

FIG. 6 is a graph showing temporal changes in a signal level output to the driver 73 and power detected by a measuring unit 74 in a case where a third color developing portion 623A is caused to develop a color.

Figure 7:
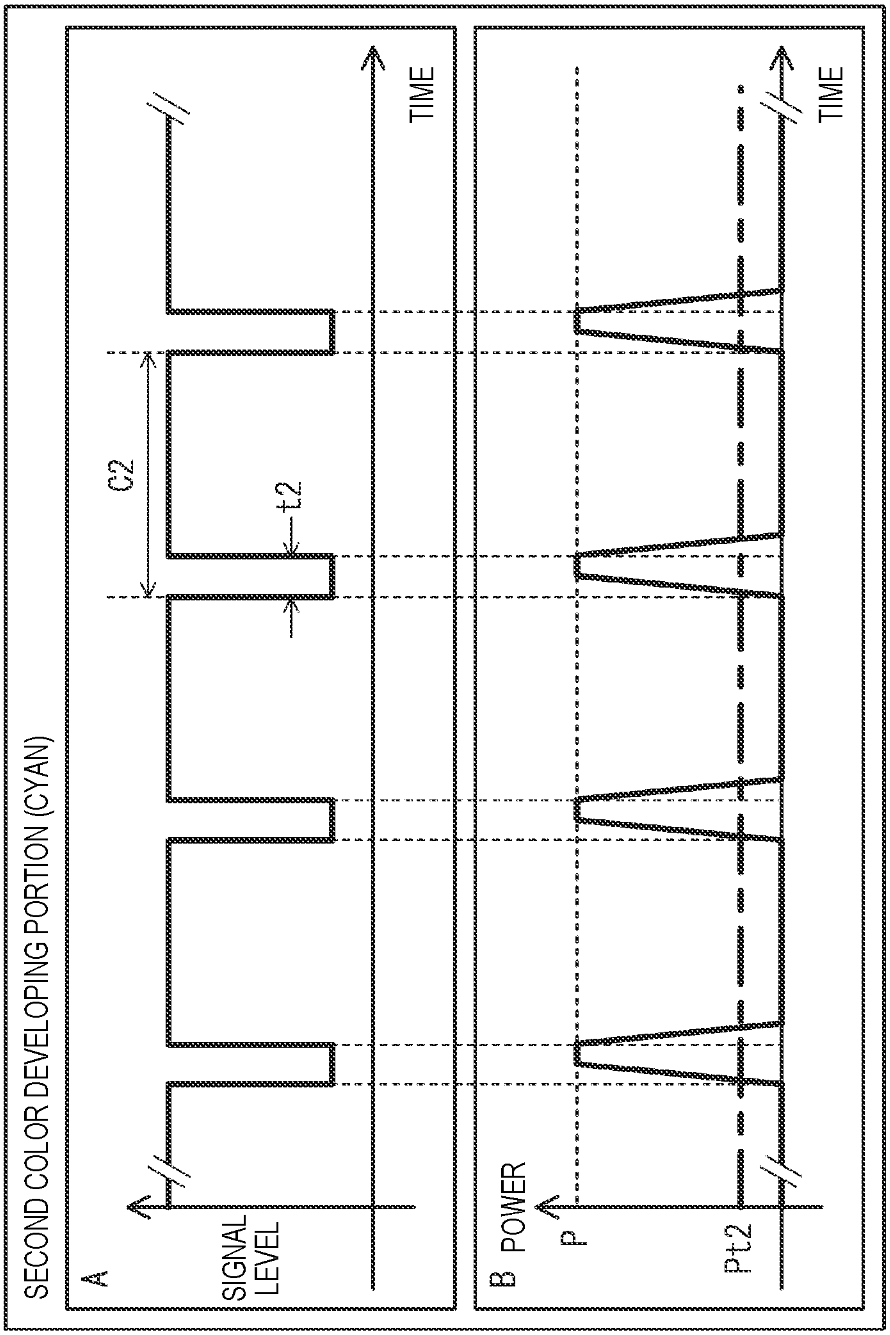

FIG. 7 is a graph showing temporal changes in a signal level output to the driver 73 and power detected by the measuring unit 74 in a case where a second color developing portion 622A is caused to develop a color.

Figure 8:
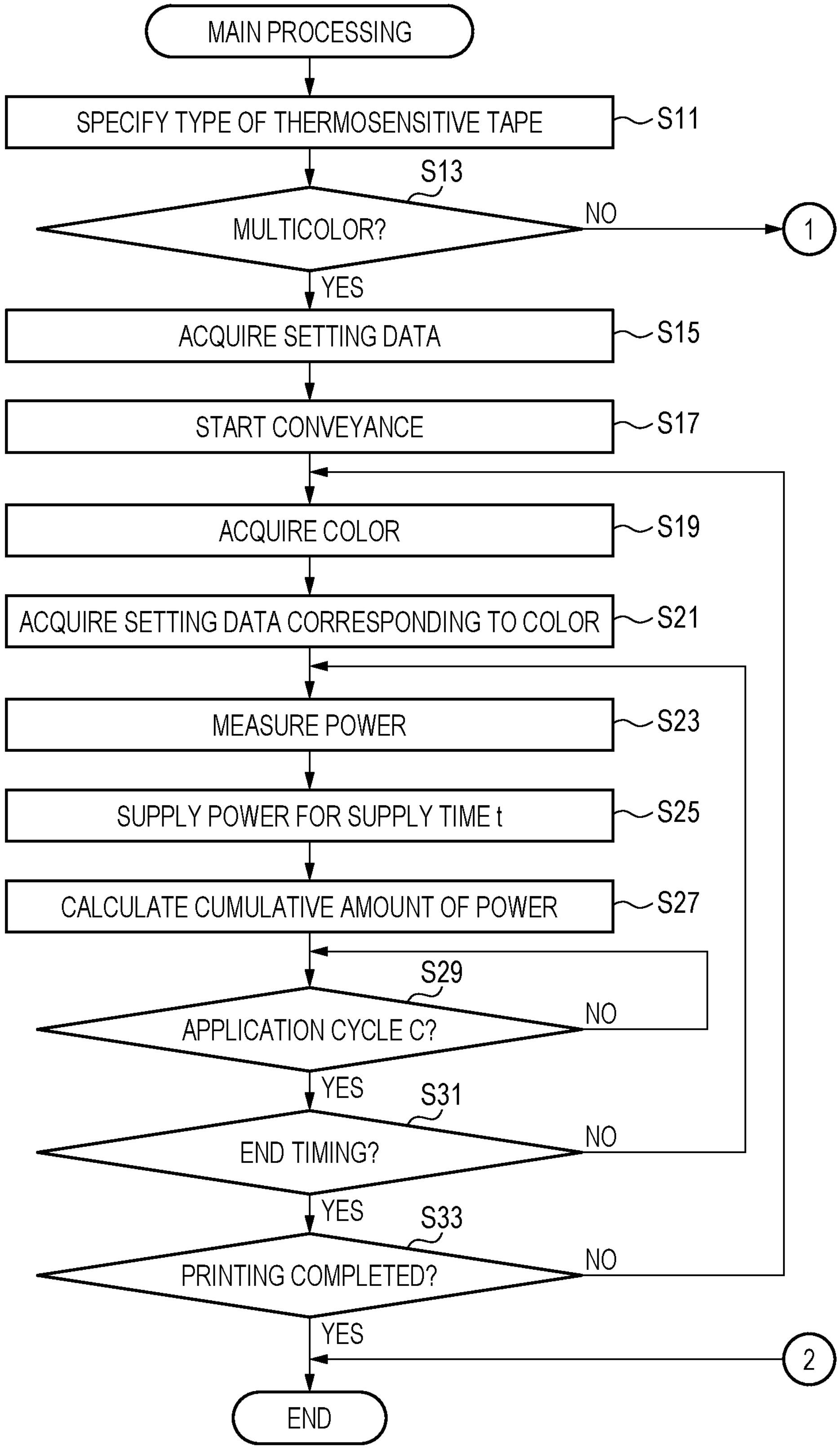

FIG. 8 is a flowchart of main processing.

Figure 9:
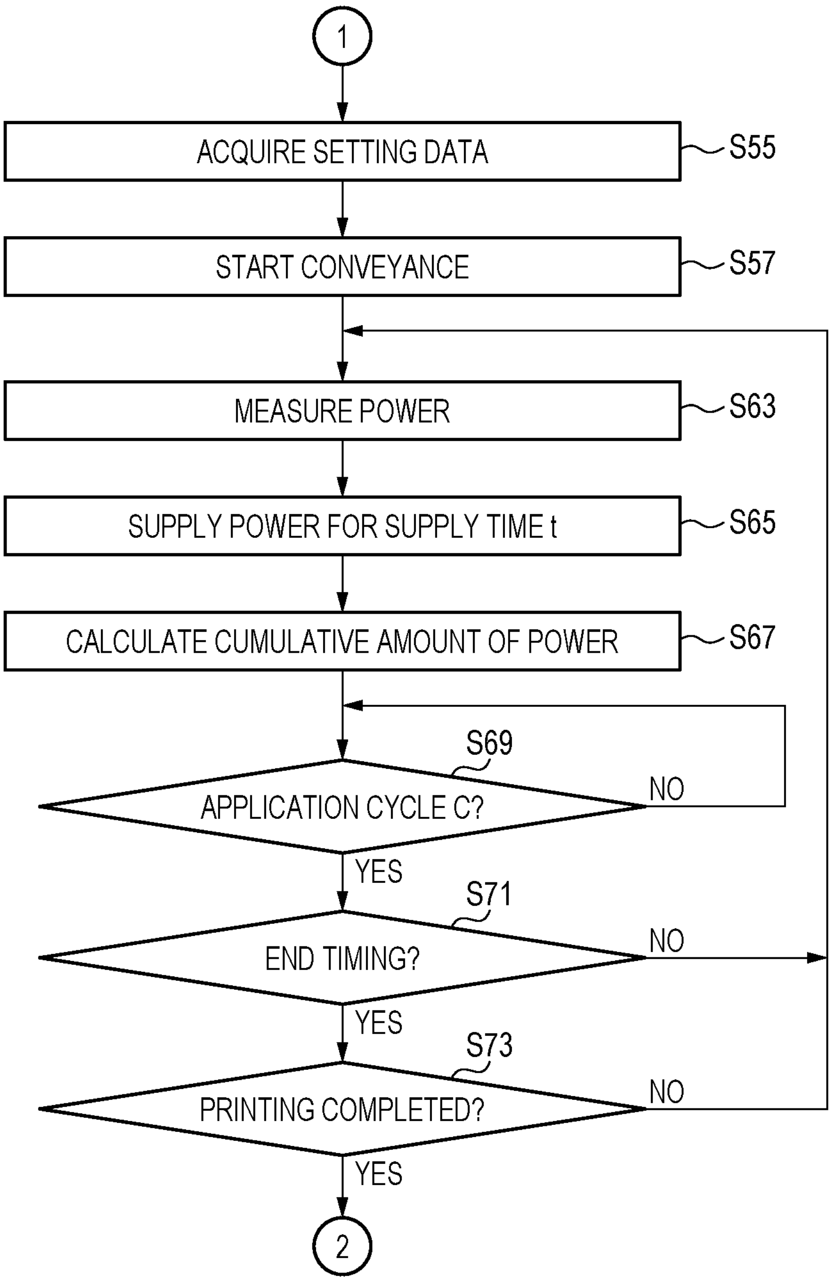

FIG. 9 is a flowchart of the main processing, which is a continuation of FIG. 8.

An embodiment of the present disclosure will be described with reference to the drawings. The drawings to be referred to are used to describe a technical feature that can be adopted by the present disclosure, and configurations and the like of described devices are not intended to limit the present disclosure and are merely illustrative examples. In a description of the present embodiment, a lower left side, an upper right side, a lower right side, an upper left side, an upper side, and a lower side in FIGS. 1A and 1B respectively correspond to a left side, a right side, a front side, a rear side, an upper side, and a lower side of a printer 1.

<Outline of Printer 1>

The printer 1 will be described with reference to FIGS. 1A, 1B, and 2. The printer 1 is a thermosensitive and thermal transfer tape printing apparatus. In the printer 1, as an example, a cassette 6 including a thermosensitive tape M as a recording medium is mounted. The printer 1 is configured to heat the thermosensitive tape M fed out from the cassette 6 by a thermal head 15, which is described later, to perform printing.

Figure 1A:
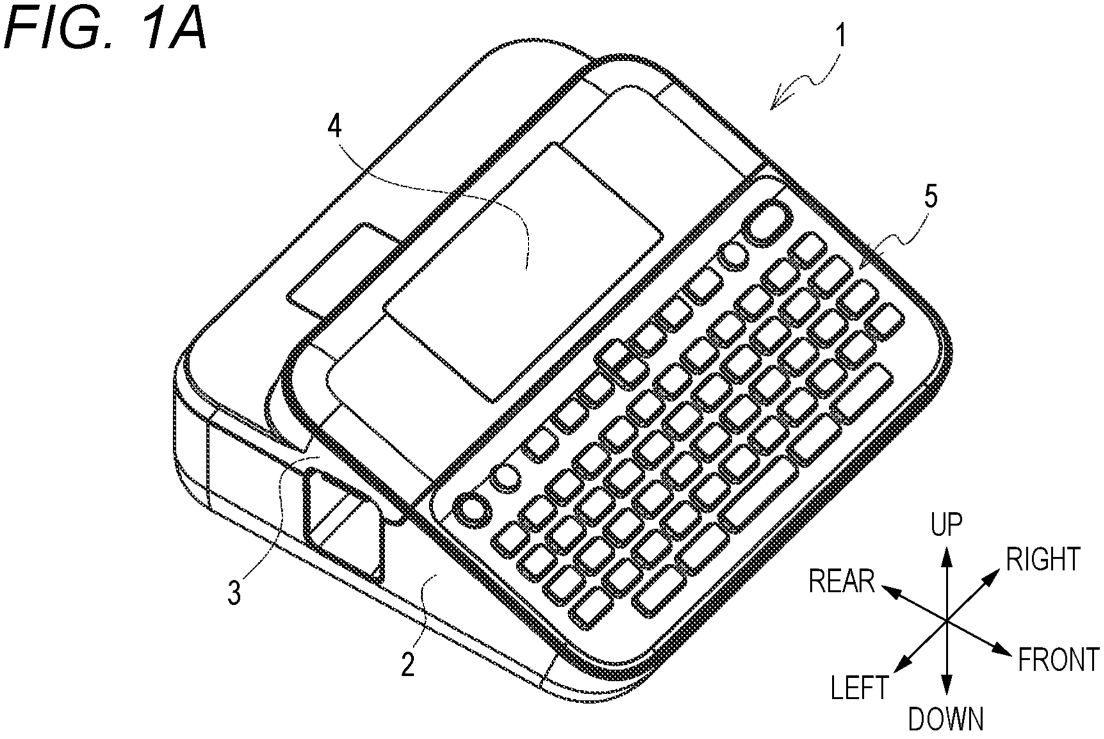
FIG. 1A is a perspective view of a printer 1 in a state in which the cover 3 is closed.
Figure 1B:
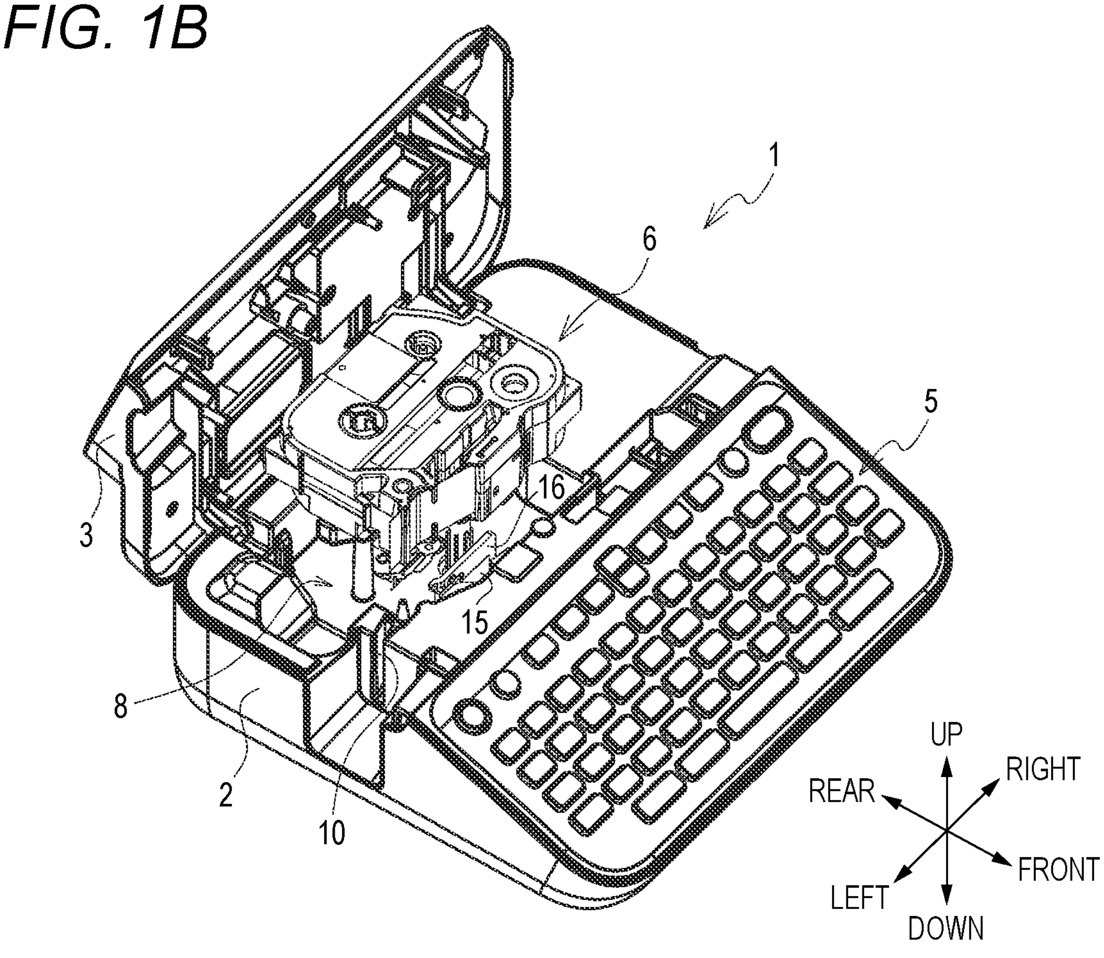
FIG. 1B is a perspective view of the printer 1 in a state in which the cover 3 is opened.

As shown in FIGS. 1A and 1B, the printer 1 includes a housing 2, a cover 3, a display unit 4, and an operation unit 5. The housing 2 has a substantially rectangular parallelepiped shape. A discharge slit 10 is formed in a left side surface of the housing 2. The discharge slit 10 is an opening extending in an up-down direction, and is configured to discharge the printed thermosensitive tape M to an outside of the housing 2. The cover 3 is supported, at a rear end portion of the housing 2, to be pivotable about an axis extending in a left-right direction. FIG. 1A shows a state in which the cover 3 is closed with respect to the housing 2, and FIG. 1B shows a state in which the cover 3 is opened with respect to the housing 2. The cover 3 is configured to be opened and closed, for example, in a case where the cassette 6 is replaced. In the following description, a configuration of each member will be described with reference to the state in which the cover 3 is closed with respect to the housing 2.

As shown in FIG. 1A, the display unit 4 is provided on an upper surface of the cover 3. The display unit 4 is, for example, a liquid crystal display, and is configured to display various types of information. The operation unit 5 is disposed in front of the cover 3 and on a front portion of an upper surface of the housing 2. The operation unit 5 is operated to input various instructions to the printer 1.

As shown in FIGS. 1B and 2, the printer 1 includes, in a space surrounded by the housing 2 and the cover 3, the cassette mounting portion 8, a head holder 16, the thermal head 15, a platen holder 13, a platen roller 11, a conveying roller 12, a motor 36, and a cutting mechanism 17.

The cassette mounting portion 8 is a recessed portion that is recessed downward and to which the cassette 6 is configured to be mounted. The head holder 16 is a metal plate and is provided in front of the cassette mounting portion 8. The thermal head 15 is mounted on a front surface of the head holder 16. The thermal head 15 includes a plurality of heat generating elements.

The platen holder 13 has an arm shape and is provided on a front side of the head holder 16. A right end portion of the platen holder 13 is pivotally supported to be swingable about a shaft 14 extending in the up-down direction. The platen roller 11 and the conveying roller 12 are pivotally supported, at a left end portion of the platen holder 13, to be rotatable about a shaft extending in the up-down direction. The platen roller 11 faces the thermal head 15, and is configured to be brought into contact with and to be separated from the thermal head 15. The conveying roller 12 is located on a left side of the platen roller 11. The conveying roller 12 is configured to be brought into contact with and to be separated from a conveying roller, which is not shown, provided on the cassette 6. The platen holder 13 is configured to swing between a standby position and a printing position, in conjunction with opening and closing of the cover 3. The printing position is a position in which the platen holder 13 is close to the cassette mounting portion 8.

In a case where the cover 3 is opened, the platen holder 13 moves from the printing position toward the standby position. The standby position is a position in which the platen holder 13 is separated from the cassette mounting portion 8. In a case where the platen holder 13 is in the standby position, a user can attach and detach the cassette 6 to and from the cassette mounting portion 8. In a case where the cover 3 is closed, the platen holder 13 swings from the standby position toward the printing position. In a case where the cassette 6 is mounted to the cassette mounting portion 8, the platen roller 11 presses the thermosensitive tape M against the thermal head 15. The conveying roller 12 is configured to sandwich the thermosensitive tape M with the conveying roller of the cassette 6.

The motor 36 is a stepping motor. A rotational driving force of the motor 36 is transmitted to the platen roller 11 and the conveying roller 12. In a case where the motor 36 is driven in a state in which the cassette 6 is mounted to the cassette mounting portion 8, the platen roller 11 and the conveying roller 12 rotate in a counterclockwise direction in a plan view.

The cutting mechanism 17 is provided on a left side of the cassette mounting portion 8 and on a right side of the discharge slit 10 (see FIG. 1B). The cutting mechanism 17 is configured to cut the thermosensitive tape M discharged from the cassette 6. The cutting mechanism 17 includes a metal fixed blade 18 and a metal movable blade 19. The movable blade 19 is disposed to facing the fixed blade 18 and is configured to move relative to the fixed blade 18.

<Thermosensitive Tape M>

The thermosensitive tape M is accommodated in a housing 60 of the cassette 6. The thermosensitive tape M is an elongated medium, and is formed by stacking a plurality of layers. The thermosensitive tape M configured to be printed by the printer 1 includes a thermosensitive tape Mm for multicolor printing and a thermosensitive tape Ms for single-color printing.

As shown in FIG. 3, the thermosensitive tape Mm for multicolor printing includes a substrate 61, a plurality of color developing layers 62, a plurality of heat shielding layers 63, and an overcoat layer 64. The plurality of color developing layers 62 include a first color developing layer 621, a third color developing layer 623, and a second color developing layer 622. The plurality of heat shielding layers 63 include a first heat shielding layer 631 and a second heat shielding layer 632.

The overcoat layer 64, the first color developing layer 621, the first heat shielding layer 631, the third color developing layer 623, the second heat shielding layer 632, the second color developing layer 622, and the substrate 61 are stacked, in this order, in a thickness direction of the thermosensitive tape Mm. The plurality of color developing layers 62 and the plurality of heat shielding layers 63 each have a transparency. During the printing of the printer 1, the platen roller 11 is in contact with a surface, located on a substrate 61 side, of the thermosensitive tape Mm, and the thermal head 15 is in contact with a surface, located on an overcoat layer 64 side, of the thermosensitive tape Mm.

The substrate 61 is a resin film. Each of the plurality of color developing layers 62 includes a color developing portion configured to develop a color in a case where a temperature rises. The first heat shielding layer 631 is configured to prevent heat conduction between the adjacent first color developing layer 621 and third color developing layer 623. The second heat shielding layer 632 is configured to prevent heat conduction between the adjacent third color developing layer 623 and the second color developing layer 622. The overcoat layer 64 protects the plurality of color developing layers 62.

The first color developing layer 621 includes a first color developing portion 621A. In a case where a temperature of the first color developing portion 621A exceeds a predetermined first temperature T1, the first color developing portion 621A has a low transparency and develops a first color. For example, the first color is yellow. The third color developing layer 623 includes a third color developing portion 623A. In a case where the temperature of the third color developing portion 623A exceeds a predetermined third temperature T3, the third color developing portion 623A has a low transparency and develops a third color. For example, the third color is magenta. The second color developing layer 622 includes a second color developing portion 622A. In a case where the temperature of the second color developing portion 622A exceeds a predetermined second temperature T2, the second color developing portion 622A has a low transparency and develops a second color. For example, the second color is cyan. The third temperature T3 is lower than the first temperature T1 (T1>T3). The second temperature T2 is lower than the third temperature T3 (T3>T2).

The thermosensitive tape Ms has a configuration in which the third color developing layer 623, the second color developing layer 622, and the plurality of heat shielding layers 63 are removed from the thermosensitive tape Mm. In a case where the temperature of the first color developing portion 621A exceeds the first temperature T1, the first color developing portion 621A included in the first color developing layer 621 of the thermosensitive tape Ms has the low transparency and develops the first color.

<Outline of Printing Action>

The printer 1 is configured to feed out the thermosensitive tape M from the cassette 6. The fed thermosensitive tape M is pressed against the thermal head 15 by the platen roller 11 while passing between the thermal head 15 and the platen roller 11. In this state, the printer 1 is configured to apply a voltage to the plurality of heat generating elements of the thermal head 15. Power is supplied to the plurality of heat generating elements in accordance with a current flow formed by the application of the voltage. The plurality of heat generating elements generate heat since the power is supplied. The plurality of heat generating elements that generate the heat is configured to apply energy to the thermosensitive tape M from the overcoat layer 64 side. Accordingly, the color developing portions of the thermosensitive tape M are heated to develop the colors, and an image is printed on the thermosensitive tape M.

The printed thermosensitive tape M is conveyed by the platen roller 11 and the conveying roller 12 rotated by driving of the motor 36, and is discharged to an outside of the printer 1 through the discharge slit 10.

<Electrical Configuration>

An electrical configuration of the printer 1 will be described with reference to FIG. 4. The printer 1 includes a CPU 71 configured to control the entire printer 1. The CPU 71 is electrically connected to a storage unit 72, the display unit 4, the operation unit 5, the motor 36, a driver 73, and a measuring unit 74. The storage unit 72 is configured to store a program executed by the CPU 71, print data, and setting data. The display unit 4 is configured to display various types of information according to signals output from the CPU 71. A signal indicating an input operation performed on the operation unit 5 is output from the operation unit 5 to the CPU 71. The CPU 71 is configured to detect the signal output from the operation unit 5 to detect the input operation performed on the operation unit 5.

The motor 36 is configured to be driven according to the signal output from the CPU 71 to rotate the platen roller 11 and the conveying roller 12. The driver 73 is configured to supply the power to the plurality of heat generating elements of the thermal head 15 in accordance with the signal output from the CPU 71. The measuring unit 74 is configured to measure the power supplied to the plurality of heat generating elements of the thermal head 15, and is configured to output, to the CPU 71, a signal indicating the measured power. The CPU 71 is configured to detect the power actually supplied to the plurality of heat generating elements of the thermal head 15, based on the signal output from the measuring unit 74.

<Details of Printing Action>

Details of a printing action will be described using a case, as an example, in which the printing action is performed on the thermosensitive tape Mm. The CPU 71 is configured to periodically supply the power to the plurality of heat generating elements of the thermal head 15, during the printing operation. A graph A of FIG. 5, a graph A of FIG. 6, and a graph A of FIG. 7 show temporal changes in a signal level output from the CPU 71 to the driver 73. The driver 73 is configured to supply the power to the plurality of heat generating elements of the thermal head 15 in a case where the signal output from the CPU 71 is at a low level. The driver 73 is configured to stop supplying the power to the plurality of heat generating elements of the thermal head 15 in a case where the signal output from the CPU 71 is at a high level. At the same time, the CPU 71 is configured to detect a power P actually supplied to the plurality of heat generating elements of the thermal head 15, based on the signal output from the measuring unit 74.

A graph B of FIG. 5, a graph B of FIG. 6, and a graph B of FIG. 7 show temporal changes in the power P actually supplied to the heat generating elements in a case where the thermal head 15 prints one dot. In the graph B of FIG. 5, the graph B of FIG. 6, and the graph B of FIG. 7, the power P is applied periodically. Hereinafter, a time, in the graph B of FIG. 5, during which the power P is supplied is referred to as a “first time t1”. A time, in the graph B of FIG. 6, during which the power P is supplied is referred to as a “third time t3”. A time, in the graph B of FIG. 7, during which the power P is applied is referred to as a “second time t2”. Although the first time t1, the third time t3, and the second time t2, in FIGS. 5, 6, and 7, are constant in each cycle, the first time t1, the third time t3, and the second time t2 are actually variable depending on the measured power. The first time t1, the third time t3, and the second time t2 are collectively referred to as a “supply time t”. Rising edges and falling edges of a waveforms shown in the graph B of FIG. 5, the graph B of FIG. 6, and the graph B of FIG. 7 are rounded due to a filter component of a circuit system in the thermal head 15.

In the graph B of FIG. 5, a time average of the power P required for causing the first color developing portion 621A to develop the color is indicated by a "first target power Pt1". In the graph B of FIG. 6, a time average of the power P required for causing the third color developing portion 623A to develop the color is indicated by a "third target power Pt3". In the graph B of FIG. 7, a time average of the power P required for causing the second color developing portion 622A to develop the color is indicated by a "second target power Pt2". The first target power Pt1, the third target power Pt3, and the second target power Pt2 are collectively referred to as a "target power Pt".

The CPU 71 is configured to calculate an amount of the power supplied to the plurality of heat generating elements of the thermal head 15, based on the detected power P and the supply time t during which the power is supplied. The CPU 71 is configured to continue the periodic power supply while changing the supply time t, until a calculated cumulative amount of power satisfies a condition. In a case where the cumulative amount of power supplied to the plurality of heat generating elements satisfies the condition, the printer 1 is configured to stop the periodic power supply to the plurality of heat generating elements.

A timing at which the CPU 71 stops the periodic power supply (hereinafter, referred to as an "end timing") varies depending on a color that the thermosensitive tape Mm develops. In the case of causing the first color developing portion 621A of the thermosensitive tape Mm to develop the color, a timing at which the cumulative amount of power supplied to the plurality of heat generating elements is equal to or greater than a first power amount E1 is the end timing. In the case of causing the third color developing portion 623A of the thermosensitive tape Mm to develop the color, a timing at which the cumulative amount of power supplied to the plurality of heat generating elements is equal to or greater than a third power amount E3 is the end timing. In the case of causing the second color developing portion 622A of the thermosensitive tape Mm to develop the color, a timing at which the cumulative amount of power supplied to the plurality of heat generating elements is equal to or greater than a second power amount E2 is the end timing. Hereinafter, the first power amount E1, the third power amount E3, and the second power amount E2 are collectively referred to as a "threshold power amount E".

An average of the cycle (hereinafter referred to as an "average cycle") of supplying the power to the plurality of heat generating elements of the thermal head 15 varies depending on the color that the thermosensitive tape Mm develops. In FIGS. 5, 6, and 7, a case in which the cycle does not change even in a case where a time elapses is shown as an example. Therefore, each cycle of FIGS. 5, 6, and 7 coincides with the average cycle obtained by averaging a plurality of repeated cycles.

As shown in FIG. 5, in the case of causing the first color developing portion 621A of the thermosensitive tape Mm to develop the color, each of the cycles of the power supply becomes a first cycle C1. As shown in FIG. 6, in the case of causing the third color developing portion 623A of the thermosensitive tape Mm to develop the color, each of the cycles of the power supply becomes a third cycle C3. As shown in FIG. 7, in the case of causing the second color developing portion 622A of the thermosensitive tape Mm to develop the color, each of the cycles of the power supply becomes a second cycle C2. The first cycle C1 and the third cycle C3 are the same (C1=C3). The second cycle C2 is longer than the first cycle C1 and the third cycle C3 (C1<C2, and C3<C2). The first cycle C1 and the third cycle C3 may be different. For example, the third cycle C3 may be longer than the first cycle C1 (C1<C3). Hereinafter, the first cycle C1, the third cycle C3, and the second cycle C2 are collectively referred to as a "supply cycle C".

A ratio (t1/C1) of the first time t1 to the first cycle C1 is referred to as a first ratio. A ratio (t3/C3) of the third time t3 to the third cycle C3 is referred to as a third ratio. A ratio (t2/C2) of the second time t2 to the second cycle C2 is referred to as a second ratio. The first ratio t1/C1 is larger than the third ratio t3/C3 (t1/C1>t3/C3). The third ratio t3/C3 is larger than the second ratio t2/C2 (t3/C3>t2/C2).

The shorter the cycle of the power supply to the plurality of heat generating elements of the thermal head 15, the more finely the time during which the power is supplied to the plurality of heat generating elements can be controlled. On the other hand, the longer the cycle of the power supply to the plurality of heat generating elements of the thermal head 15, the smaller the influence of rounding of the power actually supplied to the plurality of heat generating elements, and thus the power supplied to the plurality of heat generating elements can be controlled with high accuracy.

A thickness of each of the plurality of color developing layers 62 of the thermosensitive tape Mm and a material of each of the color developing portions differ depending on a type of the thermosensitive tape Mm. Therefore, in a case where the type of the thermosensitive tape Mm differs, the target power Pt, the threshold power amount E, and the supply cycle C which are correspond to each of the color developing portions also differ.

A case in which the printing operation is performed on the thermosensitive tape Ms for single-color printing is the same as a case in which the first color developing portion 621A of the thermosensitive tape Mm develops the color, and thus a description thereof will be omitted. In the case of the thermosensitive tape Ms, in a case where the type is different, the target power Pt, the threshold power amount E, and the supply cycle C which are correspond to the first color developing portion 621A also differ.

<Main Processing>

The main processing will be described with reference to FIG. 8. In a case where the CPU 71 detects the input operation for starting the printing via the operation unit 5, the CPU 71 is configured to start the printing by reading and executing the program stored in the storage unit 72.

The CPU 71 is configured to specify the type of the thermosensitive tape M accommodated in the cassette 6 by detecting a type of the cassette 6 mounted in the cassette mounting portion 8 (step S11). In a case where the type of the thermosensitive tape Mm for multicolor printing is specified (step S13: YES), the CPU 71 is configured to advance the processing to step S15. Hereinafter, a case in which the type of the thermosensitive tape Mm shown in FIG. 3 is specified will be specifically described as an example.

Based on the specified type, the CPU 71 is configured to read and acquire setting data, from the storage unit 72, for causing each of the first color developing portion 621A, the third color developing portion 623A, and the second color developing portion 622A to develop the color (Step S15). The setting data includes the first target power Pt1, the first power amount E1, and the first cycle C1 for causing the first color developing portion 621A to develop the color, the third target power Pt3, the third power amount E3, and the third cycle C3 for causing the third color developing portion 623A to develop the color, and the second target power Pt2, the second power amount E2, and the second cycle C2 for causing the second color developing portion 622A to develop the color.

The CPU 71 is configured to drive the motor 36 to start rotation of the platen roller 11 and the conveying roller 12. Accordingly, the CPU 71 is configured to start conveyance of the thermosensitive tape Mm fed out from the cassette 6 (step S17). Based on the print data stored in the storage unit 72, the CPU 71 is configured to acquire information on the color of the thermosensitive tape Mm to be developed (step S19). The CPU 71 is configured to select a color developing portion corresponding to an acquired color from among the first color developing portion 621A, the third color developing portion 623A, and the second color developing portion 622A. The CPU 71 is configured to acquire the target power Pt, the threshold power amount E, and the supply cycle C which are correspond to the selected color developing portion of the setting data acquired in S15 (step S21).

The CPU 71 is configured to detect the power P actually supplied to the plurality of heat generating elements of the thermal head 15, based on the signal output from the measuring unit 74 (step S23).

The CPU 71 is configured to determine a new supply time t, based on the detected power P, the supply cycle C, and the target power Pt which are acquired in step S19. Specifically, in a case where P>Pt, the CPU 71 is configured to determine the new supply time t that satisfies a relationship of $P \times (t/C) = Pt$. On the other hand, in a case where P<Pt, the CPU 71 is configured to determine the new supply time t that satisfies a relationship of t=C. The CPU 71 is configured to control the driver 73 such that the power is supplied to the plurality of heat generating elements of the thermal head 15 during the determined supply time t. The driver 73 is configured to supply the power to the plurality of heat generating elements of the thermal head 15 for the supply time t (step S25). The CPU 71 is configured to calculate the amount of the power supplied to the plurality of heat generating elements, based on the power P detected in step S23 and the supply time t. Further, the CPU 71 is configured to calculate the cumulative amount of power supplied to the plurality of heat generating elements to cause the thermosensitive tape Mm to develop the color in the color determined in step S19 (step S27).

The CPU 71 is configured to determine whether an elapsed time from the supply of the power to the plurality of heat generating elements of the thermal head 15 coincides with the supply cycle C (step S29). In a case where the elapsed time from the supply of the power does not coincide with the supply cycle C (step S29: NO), the CPU 71 returns the processing to step S29. In a case where the elapsed time from the supply of the power coincides with the supply cycle C (step S29: YES), the CPU 71 is configured to advance the processing to step S31.

The CPU 71 is configured to determine whether a timing is the end timing of the power supply to the plurality of heat generating elements of the thermal head 15 (step S31). In a case where the calculated cumulative power amount is smaller than the threshold power amount E, the CPU 71 is configured to determine that the timing is not the end timing (step S31: NO). In this case, the CPU 71 is configured to return the processing to step S23. The CPU 71 is configured to wait until the elapsed time from an end of the power supply to the plurality of heat generating elements of the thermal head 15 coincides with the supply cycle C (step S23). In a case where the elapsed time coincides with the supply cycle C, the CPU 71 is configured to repeat processing of step S25, step S27, step S29, and step S31. Accordingly, the power supply to the plurality of heat generating elements of the thermal head 15 is repeated in the supply cycle C.

On the other hand, in a case where the calculated cumulative power amount is equal to or greater than the threshold power amount E, the CPU 71 is configured to determine that the timing is the end timing (step S31: YES). The CPU 71 is configured to determine whether all the printing based on the print data is completed (step S33). In a case where the CPU 71 determines that the printing is not completed (step S33: NO), the CPU 71 is configured to return the processing to step S19. Based on the print data stored in the storage unit 72, the CPU 71 is configured to determine the color of the thermosensitive tape Mm to be developed next (step S19). The CPU 71 is configured to repeat the processing of step S21 to step S33 to cause the thermosensitive tape Mm to develop the determined color. In a case where the CPU 71 determines that all the printing is completed (step S33: YES), the CPU 71 is configured to end the main processing.

On the other hand, in a case where the type of the thermosensitive tape Ms for single-color printing is specified in step S11 (step S13: NO), the CPU 71 is configured to advance the processing to step S55 (see FIG. 9). Processing of step S55, step S57, step S63, step S65, step S67, step S69, step S71, and step S73 shown in FIG. 9 is respectively the same as the processing of step S15, step S17, step S23, step S25, step S27, step S29, step S31, and step S33 (see FIG. 8) in a case where the type of the thermosensitive tape Mm for multicolor printing is specified. That is, the processing in the case in which the type of the thermosensitive tape Ms is specified is different, from the processing in the case in which the type of the thermosensitive tape Mm is specified, in that the determination of the color of the thermosensitive tape M to be developed (step S19) and the acquisition of setting parameters (target power Pt, threshold power amount E, and supply cycle C) for causing the color developing portion corresponding to the determined color to develop the color (step S21) are not performed.

The CPU 71 is configured to read and acquire the setting data for causing the first color developing portion 621A of the thermosensitive tape Ms to develop the color from the storage unit 72, based on the specified type (step S55). The setting data includes the first target power Pt1, the first power amount E1, and the first cycle C1. At least the first cycle C1 among these data varies depending on the specified type.

Processing of step S57, step S63, step S65, step S67, step S69, step S71, and step S73 are respectively the same as the processing of step S17, step S23, step S25, step S27, step S29, step S31, and step S33 (see FIG. 8), and a description thereof will be omitted. In a case where the CPU 71 determines that all the printing is completed (step S73: YES), the CPU 71 is configured to end the main processing.

<Operation and Effects of the Present Embodiment>

In the printer 1, the supply cycle C for supplying the power to the plurality of heat generating elements of the thermal head 15 to cause the thermosensitive tape Mm to develop the color is made different between the case of causing the first color developing portion 621A to develop the color (first cycle C1) and the case of causing the second color developing portion 622A to develop the color (second cycle C2). Accordingly, the printer 1 can accurately apply, to the thermosensitive tape Mm, the power and the supply time required for causing the first color developing portion 621A and the second color developing portion 622A to develop the colors. Accordingly, the printer 1 can appropriately cause the first color developing portion 621A and the second color developing portion 622A of the thermosensitive tape Mm to develop the colors.

Specifically, in a case where high power is applied to the thermosensitive tape Mm in a relatively short time to cause the first color developing portion 621A to develop the color, the printer 1 is configured to set the supply cycle C to the first cycle C1 shorter than the second cycle C2 (C1<C2). Further, the first ratio t1/C1 is set to be larger than the second ratio t2/C2 (t1/C1>t2/C2). Accordingly, the printer 1 can precisely control the supply time for supplying the power to the thermosensitive tape Mm, in the case of causing the first color developing portion 621A to develop the color. In the printer 1, the influence of the rounding of the power actually supplied to the plurality of heat generating elements of the thermal head 15 can be reduced by relatively increasing the second cycle C2 in the case of causing the second color developing portion 622A to develop the color. Therefore, the printer 1 can precisely control the power supplied to the thermosensitive tape Mm, in the case of causing the second color developing portion 622A to develop the color.

As described above, since the printer 1 is configured to precisely control the power and the supply time according to the color developing portion that is to develop the color, the printer 1 can achieve the multicolor printing by a low-grade and inexpensive configuration.

In the printer, the first cycle C1 for causing the first color developing portion 621A to develop the color is the same as the third cycle C3 for causing the third color developing portion 623A to develop the color, or the third cycle C3 is longer than the first cycle C1, and the first ratio t1/C1 is larger than the third ratio t3/C3 (t1/C1>t3/C3). Accordingly, the printer 1 can appropriately cause the third color developing portion 623A to develop the color in addition to the first color developing portion 621A and the second color developing portion 622A.

The thermosensitive tape Mm is formed by stacking the first color developing layer 621 including the first color developing portion 621A, the third color developing layer 623 including the third color developing portion 623A, and the second color developing layer 622 including the second color developing portion 622A. In this case, it is necessary to control a temperature in the thickness direction of the thermosensitive tape Mm, and it is difficult to appropriately cause the color developing portion of each layer to develop the color. However, the printer 1 can easily achieve control for appropriately causing each of the color developing layers of the thermosensitive tape M by performing the above-described processing.

The printer 1 is configured to switch the supply cycle C for supplying the power to the plurality of heat generating elements of the thermal head 15 in order to cause at least one color developing portion in the thermosensitive tapes Mm and Ms to develop the color according to the types of the thermosensitive tapes Mm and Ms. Accordingly, the printer 1 can specify and accurately apply the power and the supply time required for causing the color developing portions of the thermosensitive tapes Mm and Ms to develop the colors for each type of the thermosensitive tapes Mm and Ms. Accordingly, the printer 1 can appropriately cause the thermosensitive tapes Mm and Ms to develop the colors.

<Modification>

The present disclosure is not limited to the above-described embodiment, and various modifications are possible. The measuring unit 74 of the printer 1 may be configured to measure a current flowing through a plurality of heat generating elements of the thermal head 15 and output a measurement result to the CPU 71. The measuring unit 74 may be configured to measure a voltage applied to the plurality of heat generating elements of the thermal head 15 and output a measurement result to the CPU 71.

The cassette 6 may further include a transparent film. The printer 1 may be configured to attach the transparent film to the thermosensitive tapes Mm and Ms printed by the thermal head 15 and may be configured to discharge the thermosensitive tapes Mm and Ms from the discharge slit 10. The thermosensitive tape Mm may not include the plurality of heat shielding layers 63. In this case, the first color developing layer 621 and the third color developing layer 623 may be in direct contact at a boundary portion, and the third color developing layer 623 and the second color developing layer 622 may be in direct contact at a boundary portion. The number of color developing layers of the thermosensitive tape Mm is not limited to three, and may be four or more. The thermosensitive tape Mm may include only the first color developing layer 621 including the first color developing portion 621A and the second color developing layer 622 including the second color developing portion 622A, and may not include the third color developing layer 623 including the third color developing portion 623A.

The thermosensitive tape Mm may not include the first color developing layer 621, the third color developing layer 623, and the second color developing layer 622. For example, the first color developing portion 621A, the third color developing portion 623A, and the second color developing portion 622A may be dispersed in a dispersion medium applied to the substrate 61.

The target power Pt and the threshold power amount E may be common regardless of the types of the thermosensitive tapes Mm and Ms.

In the printer 1, in the case of causing the first color developing portion 621A to develop a color, a cycle of supplying the power may be changed over time. For example, the printer 1 may be configured to repeatedly supply the power to the plurality of heat generating elements of the thermal head 15 in different first cycles C1(1), C1(2), C1(3), C1(4), C1(5), and the like. A first average cycle, which is an average of the first cycles C1(1), C1(2), C1(3), C1(4), C1(5), and the like, coincides with the first cycle C1 in the above embodiment. Therefore, the first average cycle is shorter than the second cycle C2 for causing the second color developing portion 622A to develop a color. In this case, the printer 1 can appropriately apply, to the thermosensitive tape Mm, a power amount required for causing the first color developing portion 621A to develop the color.

In the printer 1, in the case of causing the third color developing portion 623A to develop a color, a cycle of supplying the power may be changed over time. For example, the printer 1 may be configured to repeatedly supply the power to the plurality of heat generating elements of the thermal head 15 in different third cycles C3(1), C3(2), C3(3), C3(4), C3(5), and the like. A third average cycle, which is an average of the third cycles C3(1), C3(2), C3(3), C3(4), C3(5), and the like, coincides with a third cycle C3 in the above embodiment. In this case, the printer 1 can appropriately apply, to the thermosensitive tape Mm, a power amount required for causing the third color developing portion 623A to develop the color.

In the printer 1, in the case of causing the second color developing portion 622A to develop the color, a cycle of supplying the power may be changed over time. For example, the printer 1 may be configured to repeatedly supply the power to the plurality of heat generating elements of the thermal head 15 in different second cycles C2(1), C2(2), C2(3), C2(4), C2(5), and the like. A second average cycle, which is an average of the second cycles C2(1), C2(2), C2(3), C2(4), C2(5), and the like, coincides with the second cycle C2 in the above embodiment. Therefore, the second average cycle is longer than the first cycle C1 for causing the first color developing portion 621A to develop the color. In this case, the printer 1 can appropriately apply, to the thermosensitive tape Mm, a power amount required for causing the second color developing portion 622A to develop the color.

Further, the printer 1 may be configured to repeatedly supply the power to the plurality of heat generating elements of the thermal head 15 in the first cycles C1(1), C1(2), C1(3), C1(4), C1(5), and the like to cause the first color developing portion 621A to develop the color, repeatedly supply the power to the plurality of heat generating elements of the thermal head 15 in the second cycles C2(1), C2(2), C2(3), C2(4), C2(5), and the like to cause the second color developing portion 622A to develop the color, and repeatedly supply the power to the plurality of heat generating elements of the thermal head 15 in the third cycles C3(1), C3(2), C3(3), C3(4), C3(5), and the like to cause the third color developing portion 623A to develop the color. In this case, the first average cycle is shorter than the second average cycle. The first average cycle and the third average cycle may be the same, or the third average cycle may be longer than the first average cycle.

Further, in the above description, the printer 1 may be configured to keep the supply cycle C unchanged while the number of times of supplying the power to the plurality of heat generating elements of the thermal head 15 is smaller than a predetermined number of times, and change the supply cycle C after the number of times of supplying the power to the plurality of heat generating elements of the thermal head 15 is equal to or greater than the predetermined number of times.

<Other Components>

The thermosensitive tapes Mm and Ms are examples of the "recording medium" of the present disclosure.

What is claimed is:

1. A printer comprising:

a thermal head including a plurality of heat generating elements configured to apply energy to a recording medium, the recording medium including:

a first color developing portion configured to develop a first color in a case where a temperature of the first color developing portion exceeds a first temperature; and a second color developing portion configured to develop a second color in a case where a temperature of the second color developing portion exceeds a second temperature lower than the first temperature;

a measuring unit configured to measure power supplied to the plurality of heat generating elements of the thermal head; and a controller configured to perform control of periodically supplying the power to the plurality of heat generating elements, wherein the controller is configured to:

periodically supply the power to the plurality of heat generating elements until an end timing determined according to the power measured by the measuring unit;

set an average of a cycle for supplying the power to a first average cycle, in a case of causing the first color developing portion to develop the first color, the cycle corresponding to a time from a rising edge to a next rising edge of the supplied power; and set an average of a cycle for supplying the power to a second average cycle longer than the first average cycle, in a case of causing the second color developing portion to develop the second color, the cycle corresponding to a time from a rising edge to a next rising edge of the supplied power.

2. The printer according to claim 1, wherein the recording medium is formed by stacking a first color developing layer and a second color developing layer, the first color developing portion is included in the first color developing layer, and the second color developing portion is included in the second color developing layer.

3. The printer according to claim 2, wherein the recording medium further includes a third color developing layer, the third color developing layer including a third color developing portion configured to develop a third color in a case where a temperature of the third color developing layer exceeds a third temperature lower than the first temperature and higher than the second temperature, and the controller is further configured to set an average cycle for supplying the power to a third average cycle, in a case of causing the third color developing layer to develop the third color, the third average cycle being equal to or longer than the first average cycle and being shorter than the second average cycle.

4. A non-transitory computer readable storage medium storing a printing program executed by a computer, the computer being configured to perform control of periodically supplying power to a plurality of heat generating elements of a thermal head, the thermal head including the plurality of heat generating elements configured to apply energy to a recording medium, the recording medium including:

a first color developing portion configured to develop a first color in a case where a temperature of the first color developing portion exceeds a first temperature; and a second color developing portion configured to develop a second color in a case where the temperature of the second color developing portion exceeds a second temperature lower than the first temperature, the printing program comprising instruction that, when executed by the computer, causes the computer to:

periodically supply the power to the plurality of heat generating elements until an end timing determined according to the power measured by a measuring unit, the measuring unit being configured to measure the power supplied to the plurality of heat generating elements;

set an average of a cycle for supplying the power to a first average cycle, in a case of causing the first color developing portion to develop the first color, the cycle corresponding to a time from a rising edge to a next rising edge of the supplied power; and set an average of a cycle for supplying the power to a second average cycle longer than the first average cycle, in a case of causing the second color developing portion to develop the second color, the cycle corresponding to a time from a rising edge to a next rising edge of the supplied power.

* * * * *